United States Patent
Huck et al.

(10) Patent No.: US 7,333,425 B2
(45) Date of Patent: Feb. 19, 2008

(54) FAILURE LOCALIZATION IN A TRANSMISSION NETWORK

(75) Inventors: Martin Huck, Möglingen (DE); Dieter Beller, Korntal (DE); Stefan Ansorge, Ohmden (DE)

(73) Assignee: Alcatel, Paris (FR)

( * ) Notice: Subject to any disclaimer, the term of this patent is extended or adjusted under 35 U.S.C. 154(b) by 922 days.

(21) Appl. No.: 10/685,414

(22) Filed: Oct. 16, 2003

(65) Prior Publication Data

US 2006/0126503 A1    Jun. 15, 2006

(30) Foreign Application Priority Data

Nov. 19, 2002    (EP) .................... 02360317

(51) Int. Cl.
*H04L 12/28* (2006.01)
(52) U.S. Cl. ..................... 370/217; 370/242
(58) Field of Classification Search ............ None
See application file for complete search history.

(56) References Cited

U.S. PATENT DOCUMENTS

| | | | |
|---|---|---|---|
| 4,956,835 A | | 9/1990 | Grover |
| 5,748,611 A | * | 5/1998 | Allen et al. ............ 370/221 |
| 6,404,733 B1 | * | 6/2002 | Shah et al. ............ 370/216 |
| 6,496,476 B1 | * | 12/2002 | Badt et al. ............ 370/228 |
| 6,990,065 B1 | * | 1/2006 | Chaudhuri et al. ........ 370/221 |
| 2001/0019536 A1 | * | 9/2001 | Suzuki ................ 370/226 |
| 2002/0006112 A1 | * | 1/2002 | Jaber et al. ............ 370/238 |
| 2002/0131362 A1 | * | 9/2002 | Callon ................ 370/216 |
| 2002/0167900 A1 | * | 11/2002 | Mark et al. ............ 370/225 |
| 2002/0172150 A1 | * | 11/2002 | Kano ................ 370/216 |
| 2003/0133417 A1 | * | 7/2003 | Badt, Jr. .............. 370/254 |
| 2003/0208572 A1 | * | 11/2003 | Shah et al. ............ 709/223 |
| 2004/0057375 A1 | * | 3/2004 | Shiragaki et al. ........ 370/216 |

OTHER PUBLICATIONS

Papadimitriou D. et al. "Analysis of Generalized MPLS-Based Recovery Mechanisms (including protection and restoration), Internet Draft, Internet Engineering Task Force (IETF)" IETF Webside, 'Online! Nov. 7, 2002, pp. 1-35, XP002234808.
Lang J. P.: "Link Management Protocol (LMP), Internet Engineering Task Force (IETF)" Globecom IETF Library, 'Online! Jul. 7, 2002, pp. 1-57, XP002234809.

(Continued)

*Primary Examiner*—Andrew C. Lee
(74) *Attorney, Agent, or Firm*—Sughrue Mion, PLLC

(57) ABSTRACT

Failures are localized through the use of a Tandem Connection along a segment of a transmission path (P) to be monitored, non-intrusive intermediate Tandem Connection monitors (M), and temporary Tandem Connection sources created along the path segment in the case of a failure (F) in order to forward information about the fault location at least in downstream direction but preferably also in upstream direction. In particular, a failure adjacent network element (N3) detects the failure and activates a temporary tandem connection source function (TS3*d*, TS3*u*). This function creates a valid tandem connection signal and insert therein a failed link identifier (TTI). The network element (N4) terminating the tandem connection generates an alarm report including the failed link as indicated by the failed link identifier.

11 Claims, 4 Drawing Sheets

OTHER PUBLICATIONS

Papadimitriou D. et al.: "G.709 Encoding For Link Management Protocol (LMP) Test Messages, Internet Draft, Internet Engineering Task Force (IETF)" www. Potaroo.NET/IETF website, 'Online!, Oct. 31, 2002, pp. 1-8, XP002234810.

Kompella A.: "Routing Extensions in Support of Generalized MPLS, Internet Draft, Internet Engineering Task Force (IETF)" IETF Website, Aug. 28, 2002, pp. 1-21, XP002234811.

Katz D. et al.: "Traffic Engineering Extensions to OSPF, Internet Draft, Internet Engineering Task Force (IETF)" Traffic Engineering for Quality of Service in the internet at large scale, 'Online! Oct. 15, 2002, pp. 1-9, XP002234812.

Moy J.: "OSPF Version 2, Request for Comments (RFC), Internet Engineering Task Force (IETF)" IETF Website, 'Online!, Apr. 4, 2001, pp. 1-183, XP002234813.

* cited by examiner

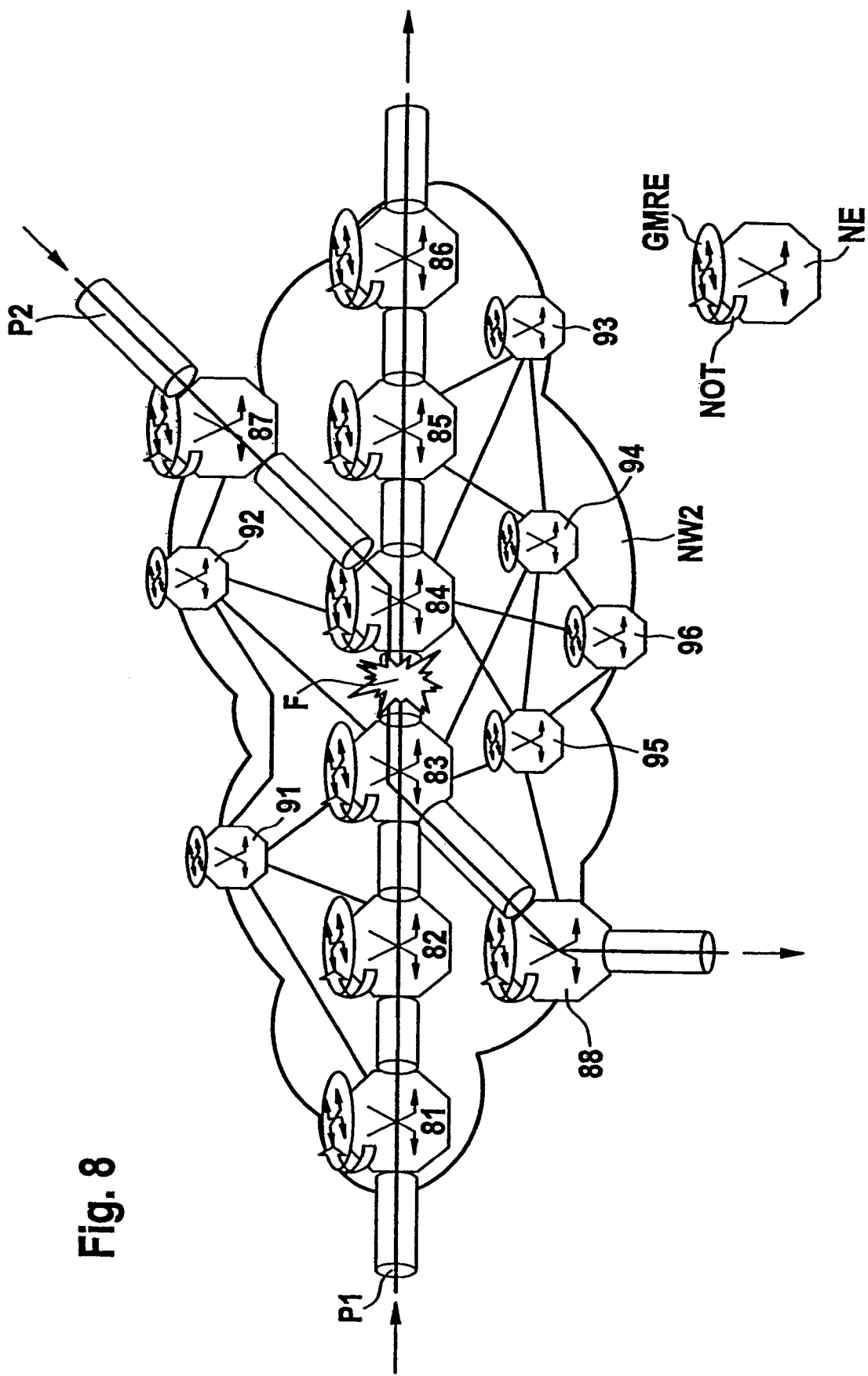

FAILURE LOCALIZATION IN A TRANSMISSION NETWORK

The invention is based on a priority application EP 02 360 317.8 which is hereby incorporated by reference.

FIELD OF THE INVENTION

The present invention relates to the field of telecommunications and more particularly to a method and corresponding network devices for performing fault localization in a transmission network, preferably in an automatically switched optical network.

BACKGROUND OF THE INVENTION

Transmission networks serve for the transport of user signals, commonly referred to as tributary signals, in the form of multiplexed transmission signals. A transmission network consists of a number a physically interconnected network elements such as add/drop multiplexers, terminal multiplexers, and cross-connects. The physical interconnection between two network elements is referred to as a section or link while the route a particular tributary takes through the transmission network from end to end is known as a path. A path is represented by a multiplexing unit such as a virtual container (VC-N) with its associated path overhead (POH) in SDH (Synchronous Digital Hierarchy). Conversely, a section is represented by an entire transmission frame such as a synchronous transport module (STM-N) with its associated section overhead (SOH).

A very basic aspect of transmission networks is availability of service. Hence, a transmission network needs to provide the means and facilities to ensure sufficient availability. Typically, these network mechanisms are distinguished in protection and restoration. The principle of both is to redirect traffic of a failed link or path to a spare link or path, respectively. Restoration means network management interaction to determine an alternative route through the network after occurrence of a failure while protection uses dedicated protection resources already available and established in the network before a failure might occur.

In order to restore a failed link or the paths on the link, the management plane needs to locate the failure in the network. This is typically achieved by analyzing alarm reports generated by the various network elements. In particular, various monitoring functions are provided at various network elements along a particular path. In the case of a failure, each of these monitors submits an alarm report. The management plane is thus flooded with a huge number of alarm reports. Fault localization is complex because the manager has to process and correlate all these alarm reports. Moreover, restoration must be delayed because the alarm reports will arrive within a certain time window.

Furthermore, fault localization by means of alarm report analysis is only feasible in centrally managed transmission networks. However, transmission networks are currently being developed where at least some functions residing in the management plane are no longer centralized in a central network management system but will be distributed across the entire network. In such a distributed control plane, a different fault localization mechanism is needed. In a first step, network elements adjacent to the fault location have to detect the failure and update their routing databases accordingly. In a second step, the routing database updates must be propagated throughout the entire network by means of routing protocols, which are running in the control plane of the network. It can take a significant amount of time to propagate the new link state information through the network upon occurrence of a failure. Moreover, this update process is not deterministic.

It is therefore an object of the present invention to provide a method and corresponding network devices which allow simplified and faster fault localization in a transmission network and which can also be employed in a distributed network management plane.

SUMMARY OF THE INVENTION

These and other objects that appear below are achieved through the use of a Tandem Connection along a segment of a transmission path to be monitored, non-intrusive intermediate Tandem Connection monitors, and temporary Tandem Connection sources created along the path segment in the case of a failure in order to forward information about the fault location at least in downstream direction but preferably also in upstream direction.

In particular, a failure adjacent network element detects the failure and activates a temporary tandem connection source function. This function creates a valid tandem connection signal and insert therein a failed link identifier corresponding to the failed link. The network element terminating and monitoring the tandem connection generates an alarm report including the failed link as indicated by the failed link identifier.

The invention has the advantages that only the tandem connection terminating network elements of a failed path will submit a fault report to the-centralized manager. Moreover restoration activities can be started earlier as no dedicated fault localization procedure must be performed in the manger upon reception of an alarm report. The average path down time is thus shortened.

In another aspect of the present invention, the failed link identifier is used to update local routing databases of intermediate network elements along a failed transmission path. This is particularly useful in label switched transmission networks, e.g., in a GMPLS/ASON. Such networks typically have a distributed control plane and thus no alarm report is sent to a central management system, but the routing information has to be updated in each network element along the failed path.

This second aspect has the advantage that information about the fault location is also available for the "local" nodes along the path. The border node is thus able to perform an optimized, i.e., failure diverse, restoration.

Other objects and advantages of the present invention will be understood in reading the following detailed description of preferred embodiments.

BRIEF DESCRIPTION OF THE DRAWINGS

Preferred embodiments of the present invention will now be described with reference to the accompanying drawings in which

FIG. 8 shows an automatically switched optical network; and

FIG. 8a shows a legend to FIG. 8.

DETAILED DESCRIPTION OF THE INVENTION

Figure 1:
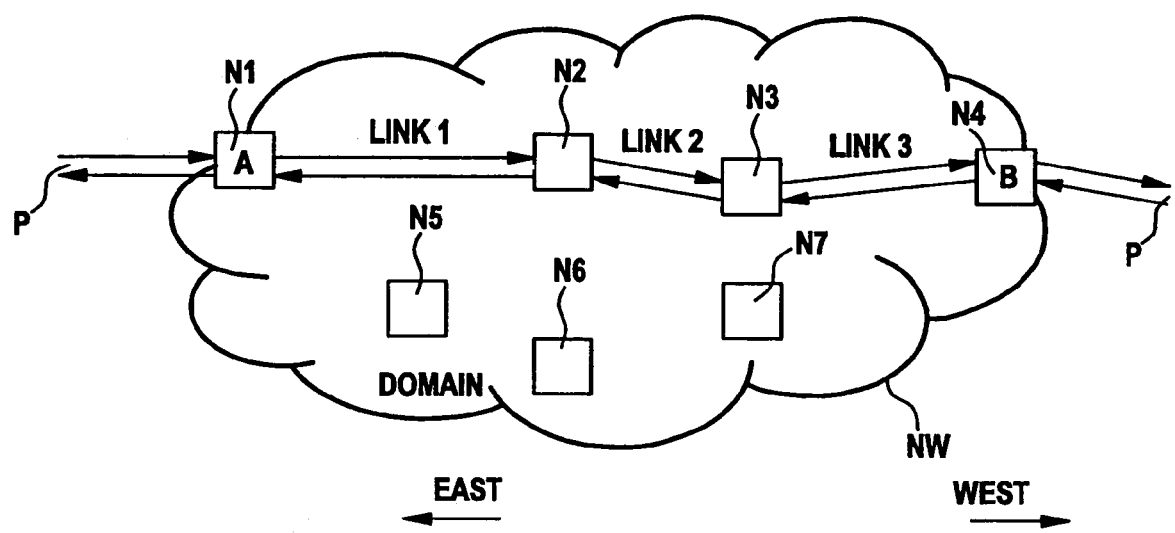
FIG. 1 shows a path through a network.

FIG. 1 shows a transmission network NW containing a number of network elements N1-N7. The network elements are physically interconnected in an arbitrary mesh structure, which is not shown in the example. Only links 1-3 interconnecting network elements N1, N2, N3, and N4, respectively, are shown in the figure. A logical connection (sometimes also referred to a sub-network connection) is established along these links, which carries a bi-directional path signal P. This path is used by way of example to demonstrate fault localization according to the invention.

If the connection from N1 to N4 fails anywhere, subsequent network elements will typically create secondary alarm reports towards the network management plane, which then has to find out the exact location of the primary fault from all these alarms. In order to simplify this fault localization process, use is made of the tandem connection monitoring functions specified in ITU-T recommendations G.707 (SDH), G.709 (OTH), G.798 (OTH Atomic Functions), and G.783, which are incorporated by reference herein.

Tandem connection monitoring in transmission networks utilizing SDH (Synchronous Digital Hierarchy) uses the N1 byte of the path overhead (POH) of a virtual container (VC-4 or VC-3) and creates a 76 byte multiframe that is periodically repeated in the N1 byte. On VC-12 or VC-2 level, the N2 byte is available for this function. A tandem connection is usually defined on a segment of a path also referred to as trail and exists for the purpose of alarm and performance monitoring. For instance, a tandem connection can be transported over a linked sequence of sections on a transmission path. A similar functionality is achieved through the tandem connection overheads in the OTH.

However, traditional tandem connection monitoring can only detect defects on a tandem connection but not the exact location of a fault. Thus with traditional tandem connection monitoring, the management system would have to create an own Tandem Connection for each link and for each network element along the path to monitor the particular links for failures. In this case, error reports for a failure would be submitted only from the affected tandem connection and direct fault localization would thus be possible. This solution has, however, the disadvantage that the overall performance of the domain, i.e., from ingress to egress network element, cannot be monitored and that the fault location is unknown at the nodes along the path. Thus it would not be possible to start a source based rerouting from a border node in the case of a failure.

Another basic idea of the present invention is thus to introduce non-intrusive tandem connection monitors along a tandem connection created on the path segment to be monitored. In the case these monitors detect any failures in the tandem connection, temporary tandem connection source will be created to mask alarm signal on the tandem connection and to forward the failure location using a reserved byte of the 76 byte tandem connection multiframe in SDH or the TTI of OTH tandem connections.

Figure 2:
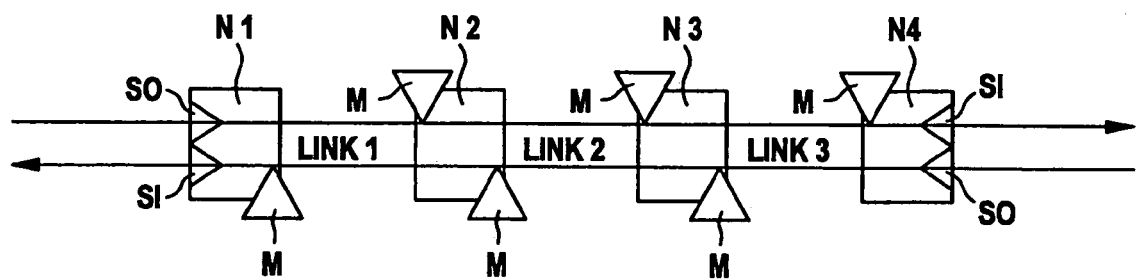
FIG. 2 shows non-intrusive Tandem Connection monitors introduced in intermediate network elements along the transmission path.

The monitored path segment is shown in FIG. 2. At the domain boundaries a bi-directional TC is started and terminated. This is achieved by activating tandem connection source SO and sink SI functions in the ingress and egress network elements N1, N4 for either direction. At each intermediate network element N2, N3 the tandem connection is monitored by non-intrusive monitors M. Even the border network elements N1 and N4 activate monitors for the received tandem connection. All these monitors M are never reporting any defects.

Figure 3:
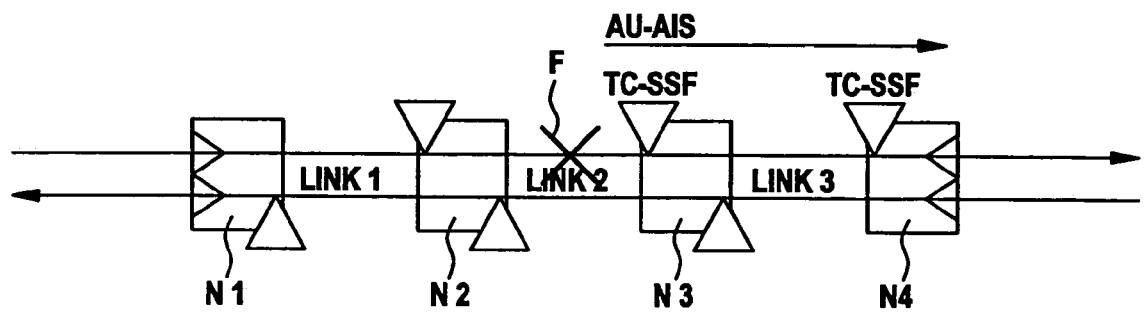
FIG. 3 shows the occurrence of a unidirectional failure on the path.

FIG. 3 shows the occurrence of a unidirectional failure F on westbound link 2. On section layer, an alarm indication signal AIS is thus created, which is coded with an "all-ones pointer" in the contained administrative unit AU4. The downstream path hence transports the AU-AIS signal. This causes on tandem connection level a server signal fail alarm TC-SSF, which is detected in the subsequent network elements by the non-intrusive monitors M.

Upon detection of a TC-SSF, each affected network element activates a temporary tandem connection source function TSn in either direction. The purpose of these temporary source functions is to insert an information about the estimated or assumed failure location into the tandem connection.

Figure 4:
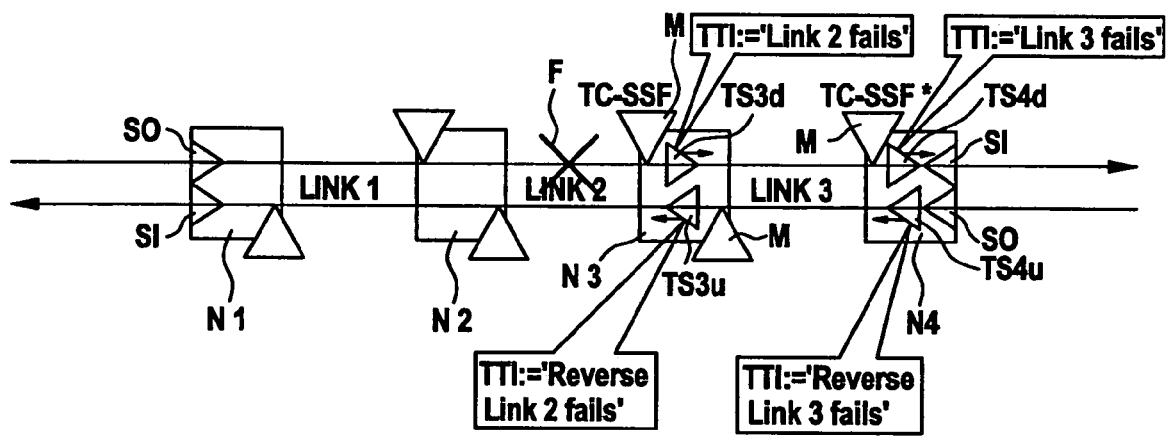
FIG. 4 shows the creation of temporary Tandem Connection sources along the path.

FIG. 4 shows an intermediate situation immediately after occurrence of the failure F. Monitor M in network element N3 detects TC-SSF and thus causes activation of temporary tandem connection source function TS3$d$ in downstream direction and TS3$u$ in upstream direction. Right before TS3$d$ has been activated, monitor M in network element N4 has also detected TC-SSF and thus activated its temporary tandem connection source TS4$d$ and TS4$u$.

The temporarily created tandem connection sources in downstream direction create new AU4 pointers and tandem connection information and therefore mask the TC-SSF alarm towards the subsequent network elements. Moreover, this "renewed" new tandem connection contains information about the failure location. Network element N3, for example, receives a TC-SSF on its interface connected to N2. It thus assumes that link 2 has failed and includes a corresponding failure report "Link 2 fails" into the tandem connection information. N4 has also detected TC-SSF and thus includes in his renewed tandem connected the information "Link 3 fails".

In reverse direction, the tandem connected is not affected by the failure. However, in order to inform the upstream nodes of the failure, the existing tandem connection is overwritten with a renewed one by upstream temporary tandem connection sources TS3$u$ and TS4$u$. TS3$u$ reports "Reverse Link 2 fails" and TS4$u$ reports "Reverse Link 3 fails".

In principle, any available byte from the 76 byte TC multiframe can be used for the failure report. However, we propose to use the so-called TTI field, i.e., the trail trace identifier field for this purpose. Analogously, the OTH tandem connection TTI can be used.

Figure 5:
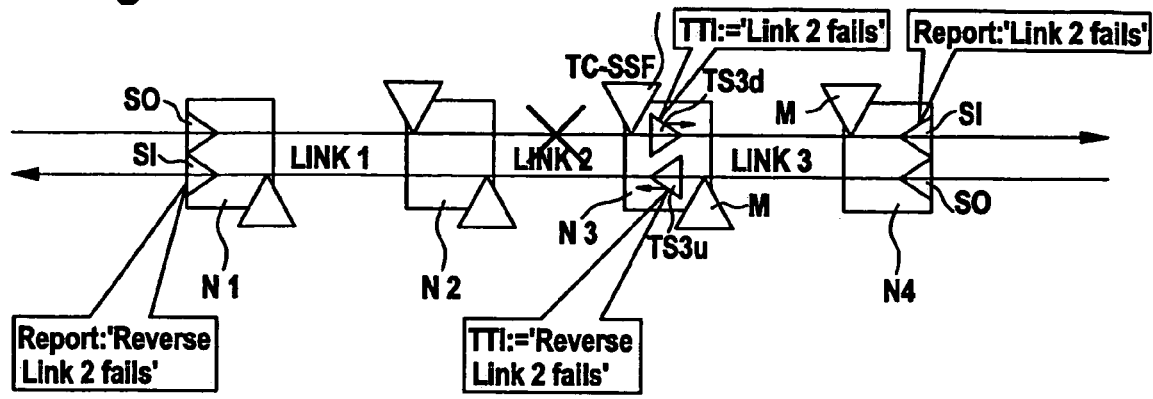
FIG. 5 shows the immediate removal of the temporary Tandem Connection sources in non-affected network elements.

As explained above, the situation in FIG. 4 is only an intermediate step, as due to the temporary TC sources, all subsequent TC-SSF alarms will vanish. All TC monitors detecting the newly received valid TC information will thus initiate removal of the temporary TC sources. When the situation has settled, only the node N3 adjacent to the failed link 2 has its temporary tandem connection sources TC3$d$ and TC3$u$ activated. All other temporary TC sources, i.e., TC4$d$ and TC4$u$ in the example, have been removed after the TC-SSF has cleared. This situation is shown in FIG. 5. As a result, temporary TC source TS3$d$ sends valid tandem connection information including in the TTI field the failure report "Link 2 fails" to downstream far end network element N4 and temporary TC source TS3$u$ sends tandem connection information including in the TTI field the failure report "Reverse Link 2 fails" to upstream far end network element N1. The boarder network elements N1 and N4 thus create an alarm report about the received failure notifications to the management plane. Such alarm reports are generated only after expiration of a hold-off timer which is greater than the detection time for the failure or typical time until the transient state has settled, i.e., until failures may have disappeared in order to avoid transient link identifier reports from being reported to the management plane.

In other words, if a link is interrupted, the downstream path transports an AU-AIS signal, which produces the TC-SSF for the TC monitors. In the first instant, all downstream TC monitors detect a TC-SSF alarm. All nodes that detect this TC-SSF alarm create temporary TC sources sending new tandem connection information in up- and downstream direction. The TC sources send an identifier of the putative failing link. As soon as a TC source is created, the AU-AIS signal is replaced again with a valid signal. Thus the TC-SSF at all downstream TC monitors disappears and the nodes remove their TC sources. Only the TC-SSF at the TC monitor next to the failing link does not disappear and this node maintains its TC sources. When this transient phase is completed, the border nodes submit an alarm report that contains the location of the faulty link. Several TC monitors and the TC sinks may detect TC-TIM (tandem connection trail trace identifier mismatch, i.e., a wrong TC-TTI is received), but this alarm shall be suppressed and shall not lead to consequent actions like AIS generation; the received TC-TTI contains the fault location.

Figure 6:
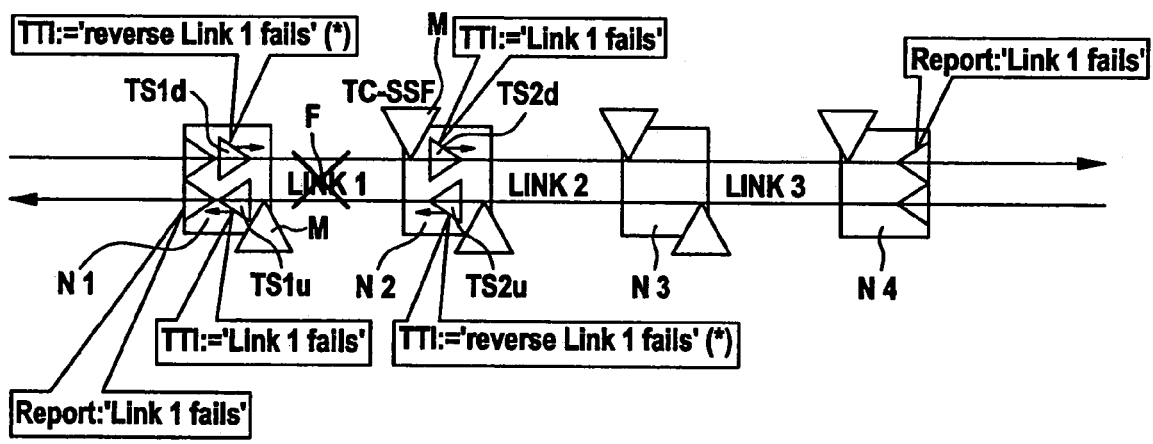
FIG. 6 shows the occurrence of a bi-directional failure on the path.

FIG. 6 shows occurrence of a bi-directional failure on link 1 after the transient phase. In westbound direction, the TC monitor in network element N2 detects TC-SSF and thus activates temporary TC sources TS2$d$ and TS2$u$ in down- and upstream direction. In eastbound direction, TC monitor in network element N1 detects the TC-SSF and activates temporary TC sources TS1$d$ and TS1$u$. All temporary TC sources report a failure of link 1 in the TTI field. TC sources TS1$u$ and TS2$u$, which report the detected failure into reverse direction, will certainly not be heard and their message lost due to the link failure, however, this will not cause any problems as the counterpart network element will anyway know of the failure. Failure reports into reverse direction will only play a role in the case of unidirectional failures.

Figure 7:
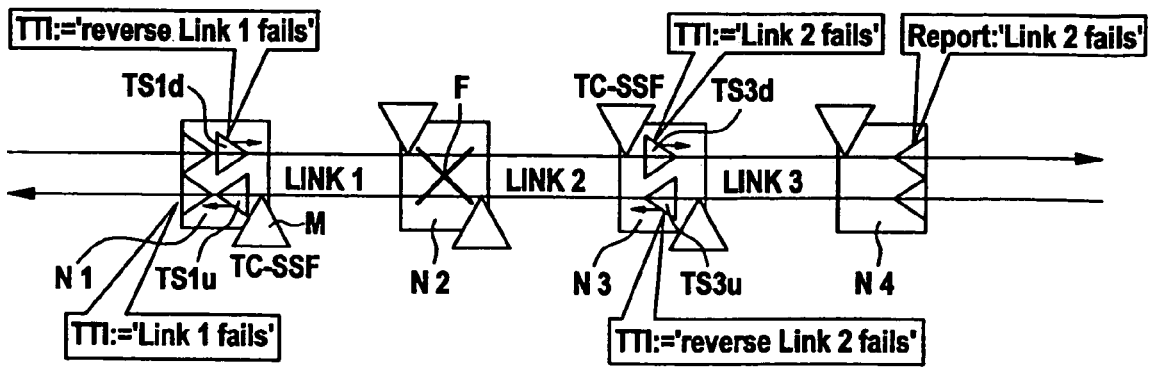
FIG. 7 shows failure of an intermediate network element.

FIG. 7 shows a complete break down of network element N2. In this case, no traffic is received from links 1 and 2 by network elements N1 and N3, respectively. N1 will thus consider link 1 as faulty while N2 will consider link 2 as faulty. The figure shows again the situation after the transient phase. N2 has activated temporary TC source TSd2, which reports a failure of link 2 and N1 has activated temporary TC source TS1$d$, which reports a failure of link 1. The TC terminating sink functions thus send corresponding alarm reports towards the management plane. As in FIG. 6, temporary TC source functions in reverse direction TS2$u$ and TS1$u$ will not be heard.

As explained above, the management plane can be either a central network management system or a control plane distributed across the network. The latter case is also referred to as an automatically switched transmission network, e.g., an ASON (automatically switched optical network).

Advantageous improvements of the invention in the case of automatically switched networks contain that the network elements along the path, which will be informed of failure by the received TC-TTI field, update the link status (i.e., link failed) in their routing databases. This has the advantage that the link state information can now be disseminated from several network elements across the network more or less simultaneously which makes the process much more efficient and reduces the overall convergence time. Another advantageous improvement of the invention is to start rerouting from the node close to the failing link and not from the border node. The network node closest to the failure determines an alternative route through the network and instructs the affected network elements to set up the corresponding bypass connection. It should be noted that the bypass not necessarily has to include the network element itself, that has determined the bypass. It should be understood that in principle any node along the failed path which immediately knows the failure location by means of this invention is capable to find an alternative route for the affected connection.

The advantages of the invention will now be explained in more detail in a second embodiment shown in FIG. 8. The figure shows a GMPLS/ASON network domain composed of physically interconnected network elements 81-96. GMPLS/ASON networks consist of a transport plane and an associated control plane. In contrast to conventional MPLS networks where both planes are coincident, the control plane is separated from the transport plane in GMPLS/ASON. The control plane is realized in a distributed fashion, i.e., each network element NE is equipped with its own controller which is called GMRE hereafter (an acronym for Generalized MPLS Routing Engine), as shown in FIG. 8$a$. Separation between transport and control plane means that the network elements NE are interconnected by means of the transport network (e.g., optical fibers, microwave links, etc), while the controllers are interconnected by an independent data communications network. The data communications network can be constituted of any suitable medium, like dedicated Ethernet Coax or twisted pair connections, but can also be transported in the data communication channels of the section overhead of transport signals from the transport plane.

Each controller stores the transport plane topology of its entire domain together with link state information in a routing database. Hence, each network element NE is in principle capable of calculating a valid route at any time from a given source to a given destination, provided that its routing database is up-to-date. It is therefore necessary that, in the case of a failure, the routing database in each GMRE in the transport plane of a GMPLS/ASON network is updated rapidly.

As already explained above, routing database updates are normally done by means of routing protocols which are running in the control plane of the network. These protocols are responsible for propagating routing database changes throughout the entire network. It therefore takes some time to propagate in the case of a failure the updated link state information through the network. Moreover, this update process is not deterministic and the propagation is only done by those network elements that detect the failure, i.e., by the network elements adjacent to the failure. Rapid routing database updates are particularly important for those GMREs that have to perform restoration actions, which are typically those network elements located at the domain boundaries (border nodes) of the affected connections.

The use of Tandem Connections in accordance with the present invention, non-intrusive intermediate Tandem Connection monitors, and temporary Tandem Connection sources along a transmission path, allows to communicate failures efficiently to all network elements along the affected paths. These intermediate network elements will then update their routing databases accordingly and disseminate the information to other network elements.

In the example shown in FIG. 8, two bi-directional network paths P1, P2 are established through the network domain. Path P1 leads from 81 via 82, 83, 84, and 85 to network element 86; path P2 leads from 87 via 84 and 83 to 88. According to the invention, tandem connections are created along these paths between 81 and 86 and between 87 and 88. Both paths are affected by a failure of the link between 83 and 84. According to the principles explained above, intermediate TC sources are activated in intermediate network elements and the failure reported in the TC-TTI field. In addition, the network elements NE notify their GMREs of the failure. This is indicated by bend arrows depicted as NOT in FIG. 8*a*.

In other words, the TC monitors and temporary TC sources along both affected connections send an alarm notification together with the identifier of the failed link to the local GMREs. All GMREs along all affected connections are thus notified more or less simultaneously including those GMREs on the border of the domain that may have to perform restoration. All these GMREs update their routing databases immediately by putting the failed link in the 'down' state. The failed link is now excluded for new connection set-up and re-routing. The non-affected nodes 91-96 are informed of the failure by conventional routing protocol mechanisms.

A particular advantage of the invention is that it allows failure diverse re-routing of failed paths signals by network elements close to the failure without additional intervention at control or management plane (in order to get the failure point). NE 83 for example can determine and establish a new route for path P1 leading via NE 94 to NE 85. NE 84, however, can determine a new route for path P2 leading from NE87 via NE92 to NE83. In these cases, the initiating network element is not involved in the bypass connection, but only triggers connection set-up.

Although having described two preferred embodiments of the invention, those skilled in the art would appreciate that various changes, alterations, and substitutions can be made without departing from the spirit and concepts of the present invention.

The invention claimed is:

1. A method of localizing a failure along a path in a transmission network, said method comprising the steps of:
    creating a bi-directional tandem connection on at least a segment of said path;
    monitoring said tandem connection at intermediate nodes along said segment;
    responsive to detecting a failure at a network element along said path segment, creating a temporary tandem connection source and sending a valid tandem connection signal comprising a failed link identifier of the adjacent link;
    at the network elements terminating said tandem connection, generating an alarm report comprising the failure location as indicated by the failed link identifier of the received tandem connection signal.

2. A method according to claim 1, wherein temporary tandem connection sources are created in upstream and in downstream direction.

3. A method according to claim 1, wherein said step of generating an alarm report is performed only after expiration of a hold-off timer which is greater than the detection time for the failure.

4. A method according to claim 1, further comprising the step of excluding the failed link as indicated by the failed link identifier from local routing databases at the intermediate network elements.

5. A method according to claim 1, further comprising the steps of updating a local routing database responsive to receiving a tandem connection signal with failed link identifier or responsive to detecting a failure condition.

6. A method according to claim 3, further comprising the steps of determining a bypass connection for re-routing the failed path signal from said updated local routing database and initiating connection set-up of said bypass connection.

7. A method according to claim 1, comprising the steps of:
    responsive to detecting an alarm signal at a network element along said path segment, creating a temporary tandem connection source and overwriting said tandem connection alarm with a valid tandem connection signal, said signal comprising a failed link identifier of the adjacent link and
    removing said temporary tandem connection source as soon as a valid signal is received again.

8. A network element for a transmission network, comprising at least one input interface and at least one output interface, said input interface comprising a tandem connection monitor function for monitoring a tandem connection transported on a received transmission signal and responsive to detecting a failure condition to initiate activation of a temporary tandem connection source function for inserting a valid tandem connection signal comprising a failed link identifier of the adjacent link.

9. A network element for a transmission network, comprising at least one input interface, said input interface comprising a tandem connection monitor function adapted to monitor a tandem connection transported on a received transmission signal and responsive to detecting a failure condition to initiate activation of a temporary tandem connection source (function for inserting a valid tandem connection signal comprising a failed link identifier of the adjacent link, said network element further comprising a tandem connection sink function for terminating said received tandem connection, said tandem connection sink function being adapted to initiate, responsive to detecting a failed link identifier in the received tandem connection, generation of an alarm report comprising the failure location as indicated by the link identifier of the terminated tandem connection signal.

10. A network element according to claim 9, comprising a local routing database, wherein said network element is adapted to update said local routing database responsive to receiving a tandem connection signal with failed link identifier or responsive to detecting a failure condition, by excluding the failed link from the local routing database.

11. A method of updating routing information in a label switched transmission network, said network comprising a number of physically interconnected network elements each comprising a local routing database, a transmission path being established along at least some of said network elements; said method comprising the steps of:
    creating a bi-directional tandem connection along at least a segment of said path;
    monitoring said tandem connection at the intermediate nodes;
    responsive to detecting a failure condition at a node along said path segment, creating a temporary tandem connection source and sending a valid tandem connection signal comprising a failed link identifier of the adjacent link;
    updating the routing information of the network elements along the path segment by excluding the failed link as indicated by the failed link identifier from their local routing databases.

* * * * *